United States Patent [19]
Brown

[11] 3,827,308
[45] Aug. 6, 1974

[54] PRECISION ROTARY INDEX

[76] Inventor: David E. Brown, 686 Irvine Dr., Erie, Pa. 16511

[22] Filed: Jan. 16, 1973

[21] Appl. No.: 324,171

[52] U.S. Cl. .................................................. 74/88
[51] Int. Cl. ............................................ F16h 27/02
[58] Field of Search ............ 74/88, 126, 89 I, 813 T

[56] References Cited
UNITED STATES PATENTS
1,184,759   5/1916   Leland .................................... 74/88
3,156,125  11/1964   Straus ..................................... 74/88
FOREIGN PATENTS OR APPLICATIONS
1,180,391  12/1958   France ..................................... 74/88

Primary Examiner—Samuel Scott
Assistant Examiner—Wesley S. Ratliff, Jr.

[57] ABSTRACT

A mechanism is disclosed for converting axial input motion or reciprocating motion of an input member to a precise unidirectional incremental angular displacement of an output member about the axis of the mechanism to achieve a predetermined amount of angular motion. This predetermined amount of angular motion results for each input reciprocation. This is achieved by using a set of three cooperating cams—one stationary locator cam and two moving cams: one drive cam moving axially and one output cam moving both axially and angularly; a spline or other axially movable angular driving device is used for subtracting the axial movement from the motion of the output cam to yield a purely rotary motion.

25 Claims, 22 Drawing Figures

PRECISION ROTARY INDEX

GENERAL STATEMENT OF INVENTION

The operational principle of the three cams is similar to that used in the retracting mechanisms common to ball point pens. It is changed in several important respects to yield high angular accuracy, smoother angular output motion and to remove the motion of reciprocation peculiar to the retractible type of pen shown in U.S. Pat. No. 3,223,072 or U.S. Pat. No. 3,144,005. The conversion of motion from axial to rotary is accomplished in a simpler, more direct and reliable manner than presently available devices and is useful for application as the operative mechanism in a wide range of components where other input means and other more complex and costly mechanisms are now used.

OBJECTS OF THE INVENTION

It is an object of the invention to provide an improved mechanism for converting axial motion to rotary motion.

Another object of the invention is to provide an improved indexing mechanism.

Another object of the invention is to provide an improved index mechanism whose simpler method of construction allows producing both a wider range of sizes and a wider range of index positions for a given size, with conventional manufacturing methods.

Another object of the invention is to provide a precision means for converting reciprocating motion to intermittent rotary motion that is simple in construction, economical to manufacture, and simple and efficient to use.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

DETAILED DESCRIPTION OF THE DRAWINGS

Figures 1, 19, 20:
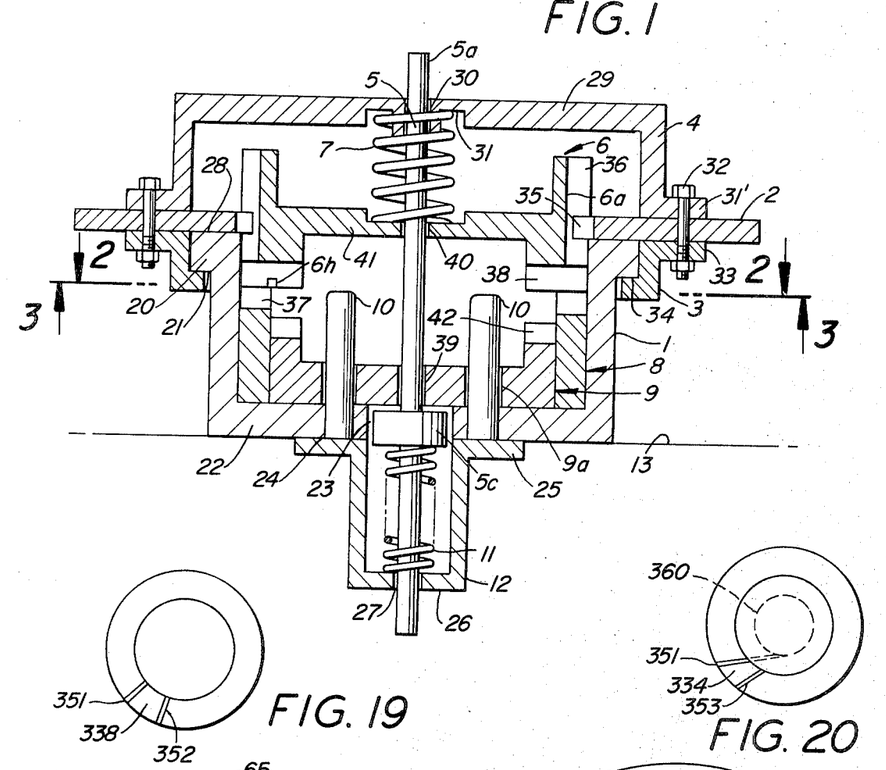
FIG. 1 is a longitudinal cross sectional view of the indexing mechanism according to the invention.
FIGS. 19 and 20 show bottom views of the index cam in two other embodiments of the invention.

Now with more particular reference to the drawings, the embodiment of the invention shown in FIG. 1 is shown by way of example only. FIG. 1 shows housing 1, with locator cam 8, and pins 10 fixed to housing 1 and retaining sleeve 12, all fixed together and supported on base 13. The housing 1 is in the form of a hollow cylinder having an annular flange 20 and a closed end 22 integral with its open upper end presenting a downwardly directed annular shoulder 21. A central axial opening 23 is formed through which the actuating rod 5 passes, actuating rod 5 has boss 5c fixed to it. The pins 10 are pressed into the openings 24 of closed end 22. The pins 10 provide a guiding means for the drive cam 9 which freely slides on the pins 10. Splines or other guiding means could be substituted for the pins to guide drive cam 9 in an axial direction. The retaining sleeve 12 is fixed to the closed end 22 of the housing 1 by means of its annular flange 25 and the retaining sleeve 12 is in the form of a hollow cup which has a closed lower end 26 in which a hole 27 is formed. The hole 27 slidably receives the actuating rod 5.

The bias spring 11 is disposed in the hollow of retaining sleeve 12. This spring 11, together with retaining sleeve 12 are employed where it is desirable to (1) bias the device upward in a half-indexed state, and/or where (2) such biasing may serve as a fail-safe provision to stop the device in a midway position should the actuation force fail or the connection to the actuator rod 5 fail. The spring 11 is a compression spring which rests at the closed end 26 of the sleeve 12 and rests at its other end on the shoulder member 5c. The housing 1 may be fixed to a machine table or it could be driven and member 2 fixed against it.

The housing 1 has a smooth annular top surface 28 on which the output disk 2 slides. A suitable antifriction surface could be provided at surface 28.

The locator cam 8 is in the form of a hollow cylinder and it has an outside cylindrical surface that is received in the inner cylindrical hollow of housing 1 and the locator cam 8 is fixed to the housing 1. The locator cam 8 has spaced teeth 37 formed on its upper end surface. Spaced teeth 37 have the cam surfaces which engage the cam surfaces on teeth 38 on the index cam 6. The locator cam 8 may be formed as an integral part of the housing.

THE COVER, OUTPUT DISK AND RETAINING COLLAR

The cover 4 is in the form of a cuplike hollow cylinder, closed at one end by the end member 29 which has a central hole 30. The central hole 30 slidably receives the upper end 5a of the actuating rod 5. An inwardly facing groove 31 is formed concentric to the hole 30 and the groove 31 receives the upper end of the spring 7. An outwardly directed annular flange 31' is formed on the cover 4 and this flange may be fixed to the flange of the retaining collar 3 with the output disk 2 sandwiched therebetween by means of suitable rivets, bolts, or other suitable fastening means indicated at 32.

The retaining collar 3 is in the form of a ring "Z" shaped in cross section having a flange 33 attached by means of bolts 32 as aforesaid and a flange 34 which underlies the shoulder 21 on the housing 1. The output disk is shown with splines 35 which mate with splines 36 on the index cam 6.

ACTUATING ROD

The device is actuated by the actuating rod 5 which is shown by way of example only. Different forms of actuating members could be provided, such as hydraulic cylinders, pneumatic cylinders, electrical solenoids, or the like for example, internal or external of the device. The rod 5 extends through the opening 27 in the lower end of the retaining sleeve 12 and extends through the hole 39 in a drive cam 9. The rod 5 extends up through hole 40 in index cam 6 and out through hole 30 in end 29 of the cover 4. The enlarged member 5c is formed integral with rod 5 and this freely moves through the opening 23 in housing 1 and engages the bottom of drive cam 9 to exert an upward force on the drive cam 9.

INDEX CAM 6

The index cam has generally the form of a disk having a splined flange 6a. It has a web 41 with a hole 40 formed therein, and on its outer periphery it has the axially extending cylindrical flange 6a with axially extending splines 36. These splines are received in the spline 35 on the output disk 2, and pins, magnetic couplings, double ended ball joint linkages, roller-groove or other axially free angular driving devices may be substituted for splines to drive the output disk 2. The output disk may also be engaged in some or all of the vertical motion of the index cam 6. The output disk 2 is clamped between cover 4 and collar 3. The downwardly facing teeth 38 are formed on the lower end of the index cam 6 separated by spaces 50 and the cam surfaces or teeth 38 engage the cam surfaces or teeth 37 on the locator cam 8.

Figure 21:
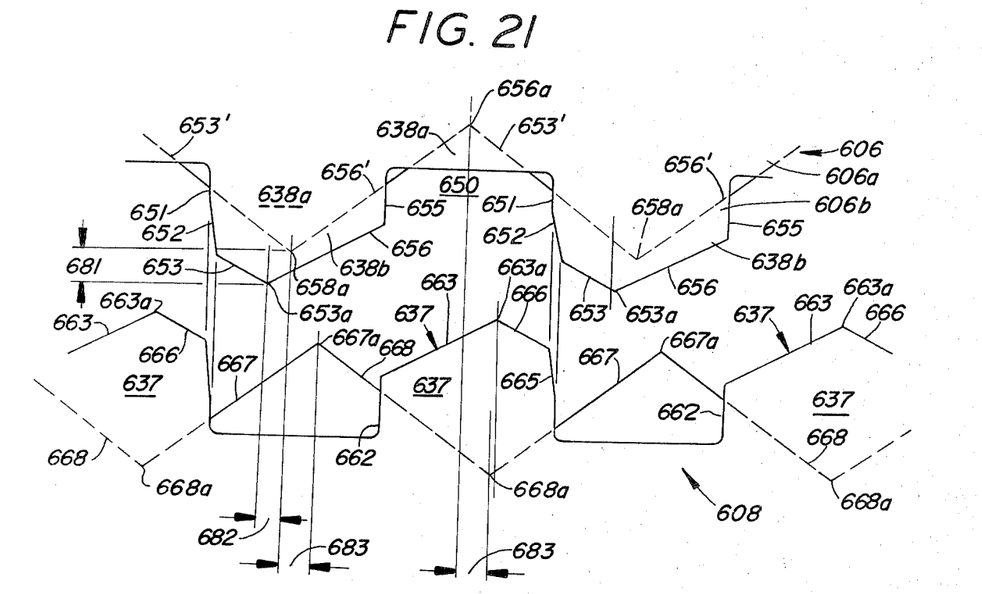
FIG. 21 is a diagram of the cams in another embodiment of the invention.
Figure 22:
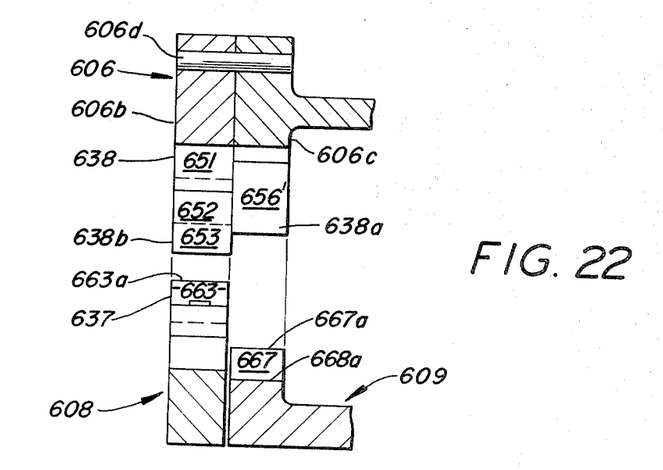
FIG. 22 is an partial cross sectional of the embodiment of FIG. 21.

In FIGS. 21 and 22, each tooth 638 of index cam 606 has six cam surfaces 652, 653, 656, 655, 653' and 656' each of which engages and slidingly cooperates with one of the following six cam surfaces: 665, 666, 663 and 662 of locator cam 608 and 668 and 667 of drive cam 609 respectively in the order listed, viz: cam surface 652 engages and slidingly cooperates with cam surface 665, etc. Each cam surface of the tooth 638 of index cam 606 is the same radial length, radial position, and inclined at substantially the same helix angle as its cooperative sliding surface, viz: 652 with 665; 653 with 666; 655 with 662; 653' with 668; 656 with 663; and 656' with 667.

The tooth forms shown in the kinematic progression of FIGS. 4–10 display cam surfaces in the case where radially adjacent index cam surfaces 53 and 53' are flush and inclined at the same helix angle. This is also true for radially adjacent index cam surfaces 56 and 56' shown. In the following description of operation FIGS. 4–10 are used for clarity of display purposes, this case being the simplest and therefore preferred embodiment.

LOCATOR CAM 8

Locator cam 8 is fixed to housing 1. It could be made integral with housing 1. Locator cam 8 has upwardly facing teeth 37 formed on it. The teeth 37 are separated by spaces 60.

The locator cam teeth 37 each have four cam surfaces 62, 63, 65 and 66 and two edge clearance surfaces 61 and 64.

DRIVE CAM 9

The drive cam 9 is slidable axially in locator cam 8. Cam 9 is in the form of a circular disk. Holes 9a slidably receive the pins 10 which extend through the holes 24 in the bottom of the housing 1. The drive cam 9 is urged up by the actuating rod 5 through boss 5c that rests on the lower side of the drive cam 9 during the operation of the device as will be more particularly explained hereinafter. Cam 9 has the upwardly facing relatively inclined convolutions 42 on which cam surfaces 67 and 68 are formed. These surfaces could be any suitable shape to perform the desired relative movement.

In operation, the rod 5 will be moved in the direction of its axis. In the first part of a cycle, the rod 5 will be moved to decompress spring 11. Spring 7 and/or spring 11 may be any other suitable resilient means, internal or external to the device. As rod 5 continues to move upward, it will bring the cam surfaces of drive cam 9 into engagement with the inner cam surfaces on index cam 6.

Spring 7 has a force sufficient to hold index cam 6 in engagement with drive cam 9 and/or locator cam 8 to provide a force capable of turning the index cam 6 and index member 2 in a manner now to be described.

Figure 4:
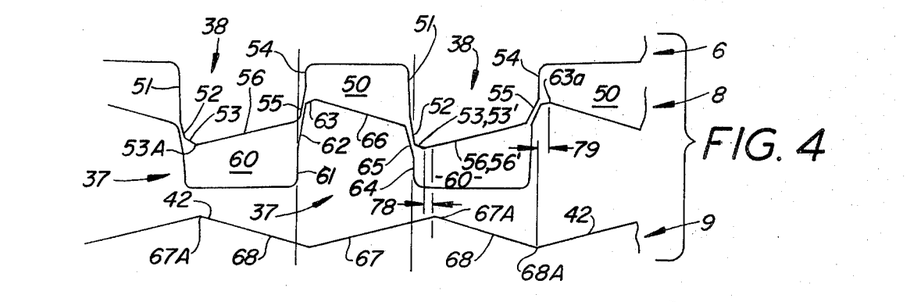
FIGS. 4, 5, 6, 7, 8, 9, and 10 show schematic views of the relative positions of the index cam, the locator cam, and the drive cam throughout one complete cycle of operation of one embodiment of the invention.
Figure 5:
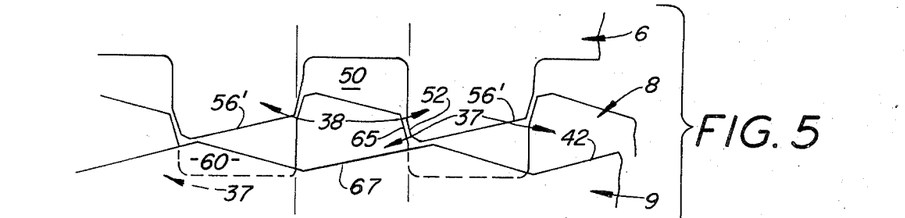
Figure 17:
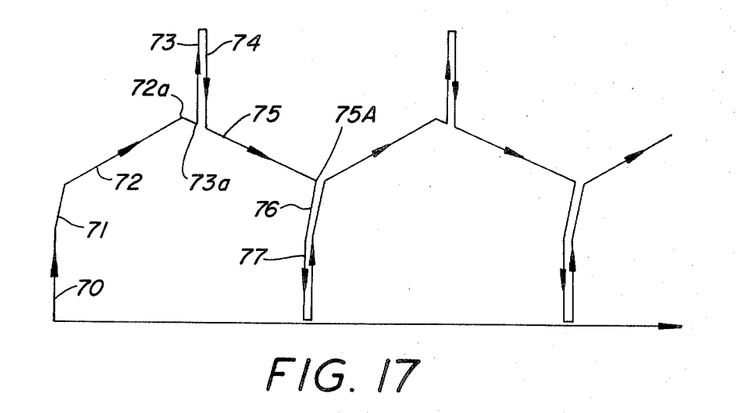
FIG. 17 is a kinematic diagram of the movement of the parts of the index cam relative to drive cam movement in the embodiments of FIGS. 4–10 according to the invention.

FIGS. 4–10 show the progressive movement of the drive cam and index cam relative to the locator cam. FIG. 17 shows a kinematic diagram of the movement of the drive cam to the index cam. This movement of the drive cam, indicated in FIG. 4, is shown at 70 in FIG. 17 as a lost motion. As the drive cam 9 engages the index cam 6, shown in FIG. 5, the surface 67 of the drive cam engages the surface 56' of the index cam, lifting and rotating the index cam. The surface 56' tends to slide along the surface 67 and the upward movement of index cam 6 is guided by the engaging surfaces 52 and 65 along the kinematic path 71 in FIG. 17.

Figure 6:
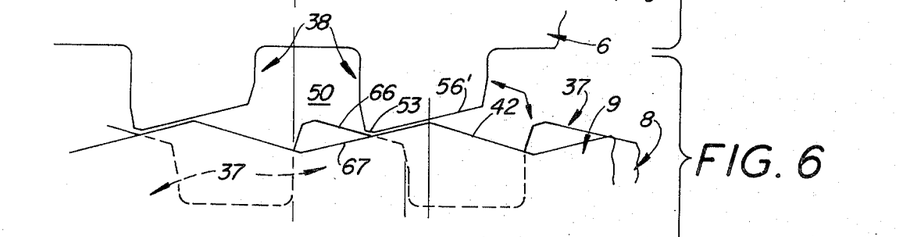

When the surface 53 of the index cam passes the upper trailing edge corner formed by surfaces 65 and 66 of the locator cam, the index cam surface 53 will begin to follow the surface 66 of the locator cam as indicated in FIG. 6, along the line indicated at 72 in the kinematic diagram in FIG. 17.

When the surface 66 passes below surface 67 of the raising drive cam 9, a "half-way" crossover occurs, shown as movement from 72a to 73a in FIG. 17, where surface 56' will slide on surface 67, rotating, to cause surface 53' to meet the surface 68 of the drive cam. The forward propulsion and subsequent reliability of indexing of the device is insured by the lowest point 53A on the index cam 6 being some effective "margin" distance 78 ahead of the highest point 67A of the drive cam 9, and the highest point 63A of the locator cam 8 lagging the lowest point 68A of the drive cam 9 by some effective "margin" distance 79. Reversing the lead and lag relationship of distances 78 and 79 reverses the output direction of propulsion of index cam 6.

Figure 7:
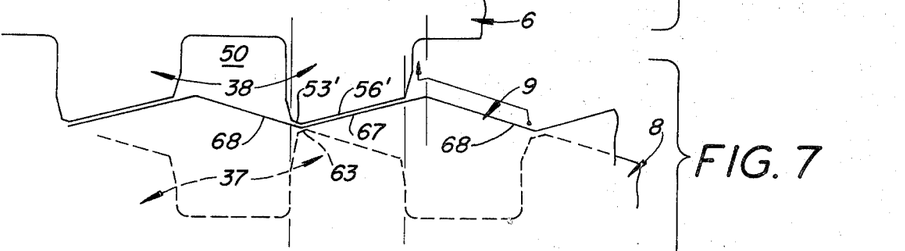
Figure 8:
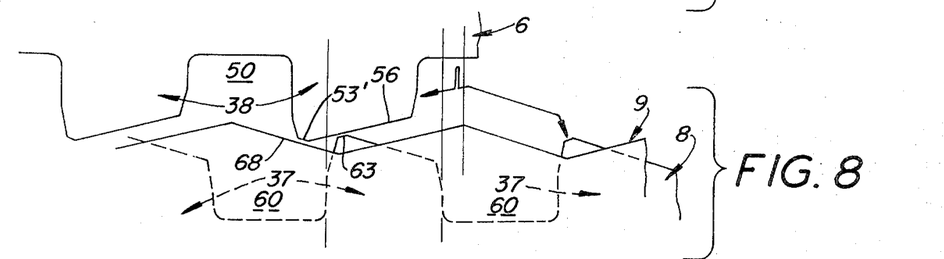

When the surface 53' of the index cam reaches the point at the intersection of surfaces 67 and 68 of the drive cam, as indicated in FIG. 7, the rotary movement of the index cam will stop and the drive cam will move the index cam parallel to the axis of rod 5, as indicated at 73 in FIG. 17, to the end of the stroke of rod 5. This point in the angular or lateral displacement of the index cam 6 may be positioned to be precisely half of an index displacement pitch or some lesser or greater value of displacement by the location of the juncture 68A of surfaces 67 and 68 on drive cam 9. The rod 5 will then descend, lowering the index cam 6 parallel to its line of movement as indicated at 74 in FIG. 17 to the point where the surface 56 engages the surface 63 of the locator cam in FIG. 8. The index cam will then start a downward rotation along a path indicated at 75 in FIG. 17 with surface 53' following the surface 68 of the drive cam and surface 56 of the index cam following surface 63 of the locator cam as indicated in FIG. 8.

Figure 9:
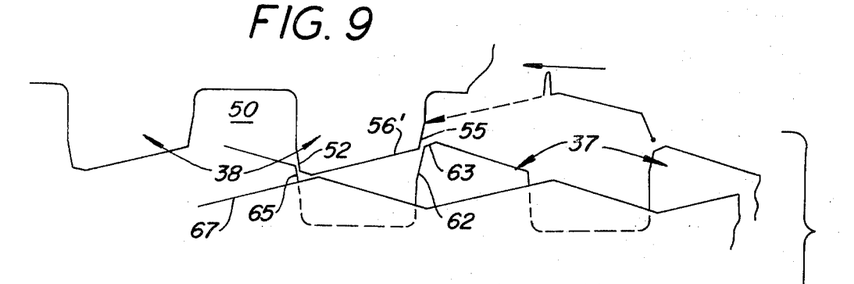

This continues until surface 53' on the index cam passes surface 68 on the drive cam, at which time the "location" crossover occurs, shown as 75A on FIG. 17, where surface 56' slides along next surface 67 until it is stopped by the next tooth surface 65 coming into sliding contact with surface 52 (FIG. 9).

Figure 10:
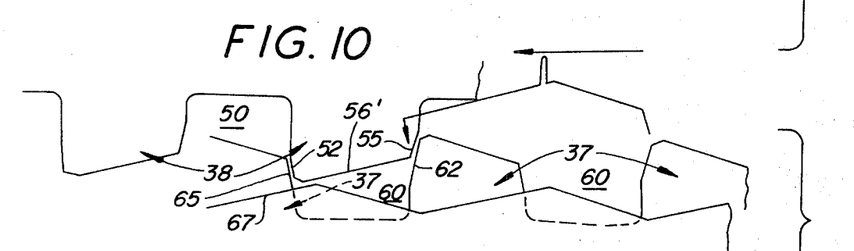

For the cam set contour shown with an inclined set of forward surfaces 65 on locator cam 52 on index cam, a slight backward rotation occurs as the sliding of surface 52 on 65 and contact of 67 surface against 56' allows surfaces 55 and 62 to approach each other as the drive cam 9 continues to lower, as shown in FIG. 9 and 76 of FIG. 17. This continues until surfaces 55 and 62 are in contact, at which time a complete index rotation has occurred, as shown in FIG. 10. The drive cam 9 may then move further straight down in lost motion, indicated at 77 in FIG. 17.

Figure 3:
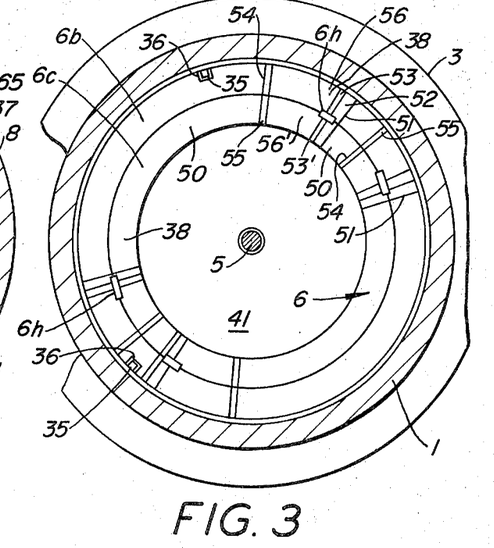
FIG. 3 is a cross sectional view taken on line 3—3 of FIG. 1.

It should be noted, however, that as is shown in FIGS. 21 and 22, several changes in the proportion, position and shape of the cam surfaces are possible without sacrificing the ability to propel the mechanism through its indexing movement. The inner (653' and 656') cam surfaces (those which slidingly engage the surfaces of the drive cam 609) of the index cam 606 may be disposed lower or higher axially than the outer surfaces (653, 656, etc. which slidingly engage the locator cam 608) by some offset 681. Index cam inner surfaces 653' and 656' may also be laterally or angularly displaced, together with their cooperative drive cam surfaces 668 and 667, some "phase" distance 682, providing the proper "margin" 683 relationship is maintained. Also, inner index cam surfaces may be formed on a separate member 606c, and pinned or otherwise rigidly mounted to outer index cam member 606b by pins 606d to form an index cam 606. Inner index cam surfaces 653' and 656' may continue to intersect at 656a' and have no need to have the undercut space 650 or end locating surfaces 652 and 655 formed on it, as they cooperate with the locator cam surfaces only. Inner index cam surfaces 653' and 656' may be separated from outer cam surfaces 653 and 656 by some undercut 6h (FIG. 3) for operational or manufacturing requirements.

Figure 18:
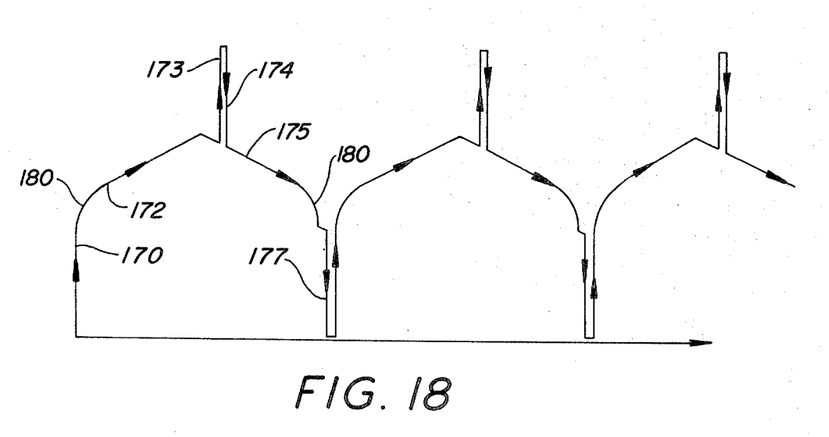
FIG. 18 is another kinematic diagram showing the relative movement of the index cam to the drive cam of the embodiment of FIG. 13.

By changing the contour and shape of the cam surfaces on the index cam 6, and/or the locator cam 8, and/or the drive cam 9, the path of relative movement of the index cam can be changed as indicated in the kinematic diagram, FIG. 18.

Figure 11:
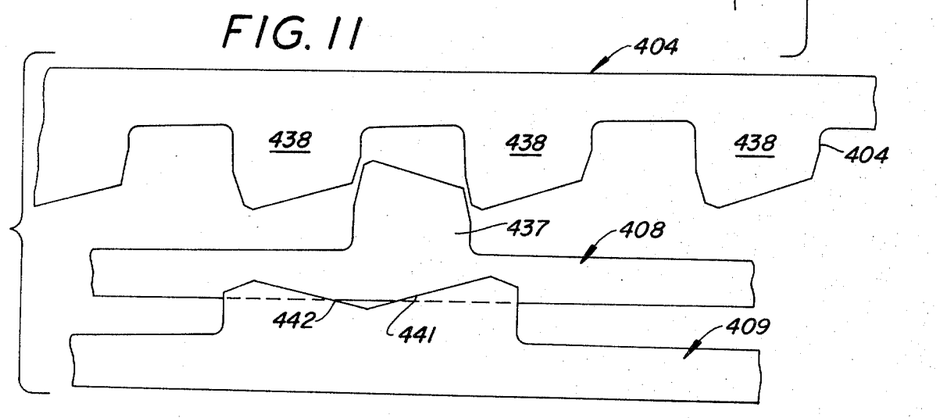
FIG. 11 shows another embodiment of the cam in a linear configuration.

FIG. 11 shows an arrangement that could be used in an in-line device wherein the cams are all disposed in a linear fashion. In FIG. 11 a plurality of indexing cam teeth 438 would be supported on the indexing cam 404 which mate on a single locator cam tooth 437 supported on locator cam member 408 which would be fixed to a stationary or moving member. A drive cam 409 would be supported on a movable actuating member which could be in the form of a hydraulic cylinder, an electric solenoid, or a mechanical driven device supported on the machine member. The cam surfaces 441 and 442 and the teeth 437 and 438 cooperate in the manner that the corresponding teeth in the cylindrical cam members of the first embodiment of the invention operate.

Figure 12:
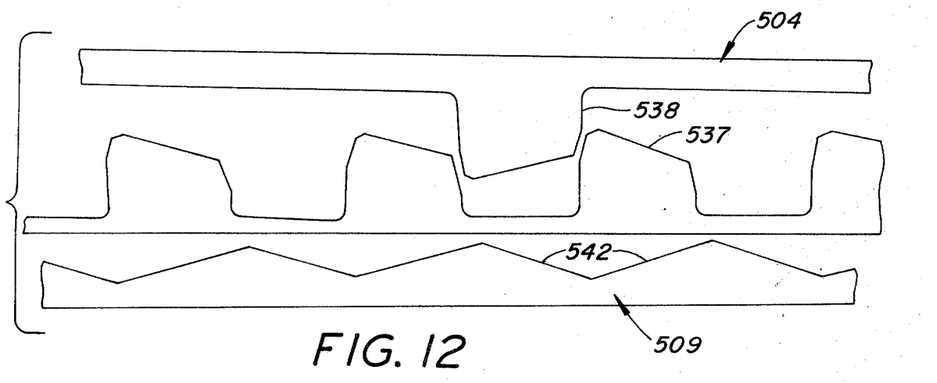
FIG. 12 shows another embodiment of the cam in linear configuration.

FIG. 12 shows a device similar to FIG. 11 in another embodiment wherein the drive cam 509 has a plurality of cam surfaces 542. The locator cam has a plurality of teeth 537 and a single indexing tooth 538 is supported on the indexing member 504 which is to move in axial relation to the fixed teeth 537. A lost motion device could be provided to develop pure linear motion from index member 504.

All of the engaging surfaces on all of the teeth on each embodiment are preferably made of an inclined planar shape in the above linear devices of FIGS. 11 and 12. Teeth 438 of index cam 404 in FIG. 11 and tooth 538 of index cam 504 may be part of a flexible member so as to allow becoming part of an endless chain, band, or belt configuration to form a continuous linear indexing sequence mechanism.

FIGS. 13, 14, 15, and 16 show different contours of cams that can be provided, to give different kinematic movement.

Figure 13:
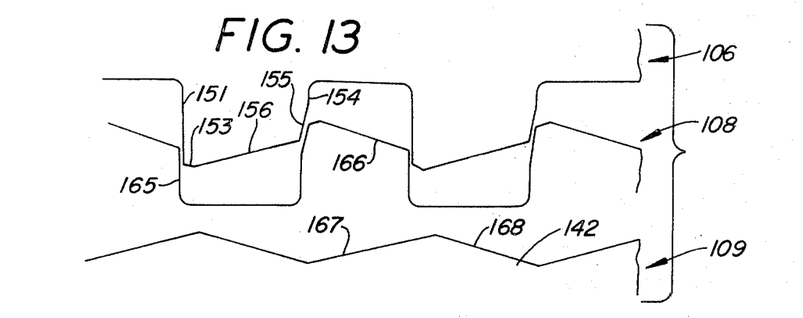
FIG. 13 shows another embodiment of cam contour.

In the embodiment of FIG. 13, the index cam 106, locator cam 108, and drive cam 109 are shown similar to the embodiment of FIGS. 1–10 except the teeth are shorter and leading edge surface 151 is parallel to the axis of the actuator. The relative movement of these cam forms is shown in the kinematic diagram in FIG. 18.

It will be noted that because of the shape of the leading edge surface 151 and its conjugate locator cam surface 165 there is a vertical movement 170 as shown in the kinematic diagram in FIG. 18 instead of two movements 70 and 71 of FIG. 17. Also, there is no backward rotation at the end of the index cycle as is in FIG. 17.

Figure 14:
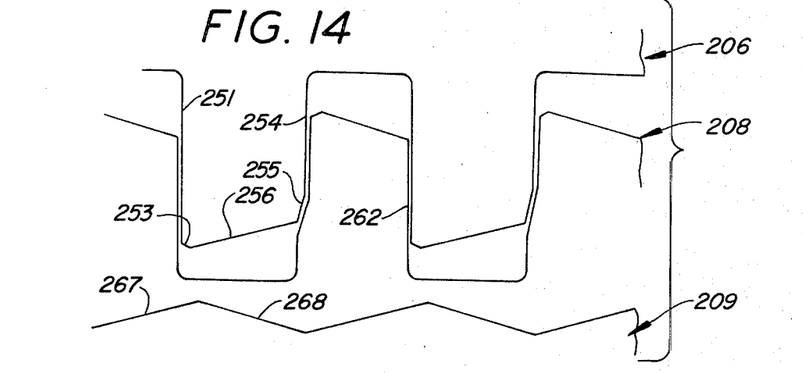
FIG. 14 shows another embodiment of cam contour.

The embodiment shown in FIG. 14 has drive cam 209, locator cam 208, and index cam 206, similar to the embodiment of FIGS. 1–10 but the teeth are considerably longer and the leading edge 251 is continuous as is the leading edge 151 in FIG. 13. The tip surface 256 is similar to the corresponding tip surface 156 in FIG. 13 and the trailing edge surfaces 255 and 254 are in similar location to the corresponding surfaces 155 and 154 in FIG. 13, however, they are of a different proportion. This cam form set will follow a similar kinematic pattern to FIG. 18, with the addition of allowing angular dwell in the initial and final portion of vertical motion of the index cam.

Figure 15:
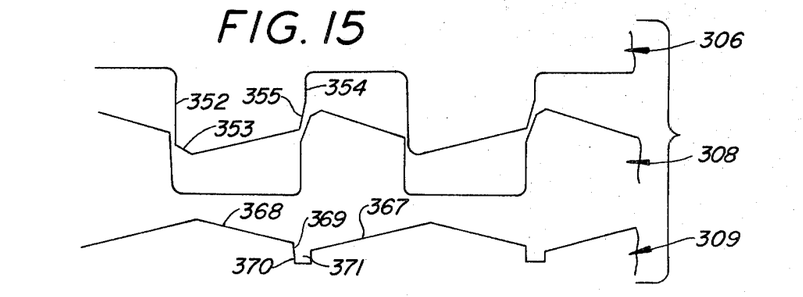
FIG. 15 shows another embodiment of cam contour.

In the embodiment of the invention shown in FIG. 15, the teeth on the locator cam 308 and on the index cam 306 are similar to the corresponding teeth in FIG. 13. The drive cam 309, however, is formed to present a stop surface 369 to the index cam 306 at the "half way" crossover which will, in the upper lost motion area of 173, and 174 of FIG. 18, be more precisely angularly repeatable, as it is more nearly parallel to the input axis of the device. A surface 368 provides an analogous surface to 168 in FIG. 13. The undercut area 371 is formed in the drive cam 309 for ease of manufacture, or also to provide a place for wear particles to settle.

Figure 16:
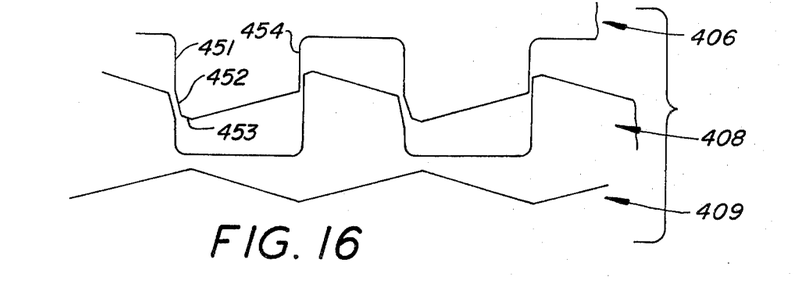
FIG. 16 shows another embodiment of cam contour.

In the embodiment of the invention shown in FIG. 16, the index cam 406, locator cam 408, and drive cam 409 are supported on a structure similar to that in the preceding embodiment although the trailing edge flank surface 454 runs from the root to the tip and the leading flank surfaces 451, 452 and 453 are similar to that shown in the embodiment of FIG. 10. This embodiment will follow a kinematic pattern similar to FIG. 17.

FIGS. 19 and 20 show an alternate of a helical tooth arrangement that can be made to increase the surface contact of the cam. FIG. 20 shows a cross sectional view dissimilar to FIG. 2 wherein the leading edge 351, the trailing edge 353 and the elements of the helical form of a tooth 334 are disposed in a tangent line to a circle 360 formed around the center of the device.

Figure 2:
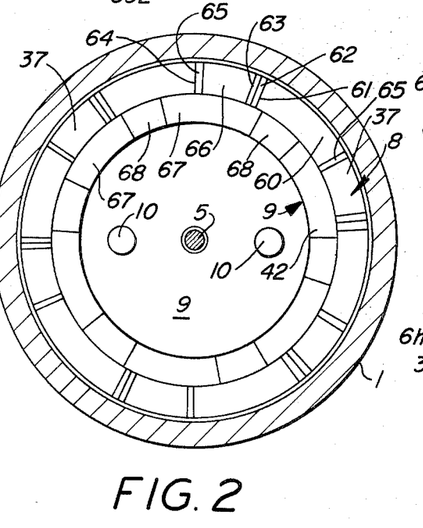
FIG. 2 is a cross sectional view taken on line 2—2 of FIG. 1.

FIG. 19 shows the tooth 338 having its side edges 351 and 352 disposed on a radial line passing through the center of the device, similar to FIG. 2.

The teeth on the index cam, drive cam and locator cam could be disposed in a helical path as indicated in FIG. 19 and FIG. 20, or some other linear or curvilinear, radial or tangent form, so as to achieve substantial sliding contact.

FIGS. 21 and 22 show another embodiment of the invention wherein the index cam 606 is made up of two concentric cam portions 606b and 606c which are disposed concentric to each other and pinned together by a pin 606d.

The drive cam 609 is similar to the drive cam 9 in FIG. 9. The drive cam 609 has the inclined cam surfaces 667 and 668 which meet at the upper apex 667a and the lower apex 668a.

The index cam 606 has teeth 638 made up of the inner teeth 638a and the outer teeth 638b. The inner teeth 638a have cam surfaces 653' and 656' inclined to each other. The outer teeth 638b have leading edge cam surfaces 652 and 653 and trailing cam surfaces 655 and 656. The teeth 638a with their respective cam surfaces cooperate with the cam surfaces on the drive cam 609. The locator teeth 637 cooperate with the index cam teeth 638b.

The index cam of the embodiment of FIGS. 21 and 22 gives considerably more versatility than an index cam of the type shown in the other embodiments.

It will be noted that the apex 658a is spaced vertically in amount 681 from the apex 653a. It will also be noted that the horizontal spacing between the apex 658a will be an amount 682 from the apex 653a. The apex 658a will be spaced a horizontal amount 683 from the apex 667a. It will also be noted that apex 668a is spaced an amount 683 from apex 656a.

In circular application, as in FIG. 1, the number of stations or pitches may vary over a range of a minimum of two to any practical maximum that a manufacturing process could produce. For example, two pitches would be equal to an 180° index increment; six pitches would be equal to a 60° index increment.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A mechanism for converting axial motion to another kind of intermittent motion comprising
    an index output cam,
    a locator cam,
    a drive cam,
    a housing and a drive member,
    said locator cam being fixed to said housing,
    an index member,
    said drive member having means thereon engaging said drive cam for moving said drive cam relative to said housing,
    means on said housing engaging said drive cam guiding said drive cam in a predetermined path relative to said housing,
    means urging said index cam into engagement with said locating cam,
    means on said index cam slidably and non-rotatably engaging guide means on said index member for moving said index member in a first direction with said index output cam,
    spaced teeth on said locator cam facing said index output cam,
    spaced index teeth on said index cam interfitting with said locator teeth,
    inclined drive surfaces on said drive cam adapted to engage said index teeth whereby said index teeth are moved from said spaces in said drive cam teeth and said index cam is moved relative to said housing at a controlled sequence,
    said drive cam, said index cam and said locator cam each having cam surfaces,
    said cam surfaces on said locator cam engaging said cam surfaces on said index cam,
    and said cam surfaces on said drive cam engaging said cam surfaces on said index cam whereby said index cam is moved relative to said drive cam in a precise incremental and progressive kinematic path.

2. The mechanism recited in claim 1 wherein said index cam is moved in rotation.

3. The mechanism recited in claim 1 wherein said drive cam has a closed end and said means on said housing engaging said drive cam comprises axially extending means fixed with respect to said housing slidably engaging said drive cam member whereby said drive cam is restrained to move axially relative to said mechanism.

4. The mechanism recited in claim 1 wherein said drive member is an actuating rod and slidable axially relative to said mechanism and said rod has means engaging said drive cam.

5. The mechanism recited in claim 1 wherein said index cam is circular and said means on said index cam slidably and non-rotatably engaging means on said index member comprises spline teeth on the outside periphery of said index cam, and on the inside periphery of said index member.

6. The mechanism recited in claim 1 wherein said index teeth and said locator teeth have helical shaped surfaces thereon engaging each other,
and said drive teeth have surfaces slidably engaging said index teeth moving said index cam in a path relative to said housing.

7. A mechanism for intermittent movement along a path comprising
a fixed locator cam,
a movable index cam,
and a movable drive cam,
said index cam being adapted to be attached to a member to be indexed,
said index cam having a tooth means,
said locator cam having tooth means engaged by said index cam tooth means,
means urging said index cam into engagement with said locator cam,
said drive cam having a cam surface engageable with said index cam tooth means whereby said index cam is moved intermittently along said path at a controlled sequence,
said drive cam, said index cam and said locator cam each having cam surfaces,
said cam surfaces on said locator cam engaging said cam surfaces on said index cam,
and said cam surfaces on said drive cam engaging said cam surfaces on said index cam whereby said index cam is moved relative to said drive cam in a precise incrementally progressive kinematic path.

8. The mechanism recited in claim 7 wherein said drive cam is restrained to move in a direction perpendicular to said path.

9. The mechanism recited in claim 7 wherein said tooth means on said drive cam and said tooth means on said locator cam each comprising a plurality of teeth.

10. The mechanism recited in claim 7 wherein said locator cam tooth means and said drive cam tooth means each comprise a plurality of teeth,
and said index cam has an index tooth.

11. The mechanism recited in claim 7 wherein said tooth means on said drive cam and said tooth means on said locator cam each comprise a single tooth,
and said index cam has a plurality of teeth.

12. A mechanism for intermittent movement along a linear path comprising
a fixed locator cam,
a movable index cam,
and a movable drive cam,
said index cam being adapted to be attached to a member to be indexed,
said index cam having a tooth means,
said locator cam having tooth means engaged by said index cam tooth means,
means urging said index cam into engagement with said locator cam,
said drive cam having a cam surface engageable with said index cam tooth means whereby means on said index cam is moved intermittently and progressively along said linear path.

13. The mechanism recited in claim 12 wherein said drive cam is restrained to move in a direction perpendicular to said linear path.

14. The mechanism recited in claim 12 wherein said tooth means on said drive cam and said tooth means on said locator cam each comprising a plurality of teeth.

15. The mechanism recited in claim 12 wherein said locator cam tooth means and said drive cam tooth means each comprise a plurality of teeth,
and said index cam has an index tooth.

16. The mechanism recited in claim 12 wherein said tooth means on said drive cam and said tooth means on said locator cam each comprises a single tooth,
said index cam has a plurality of teeth.

17. The mechanism recited in claim 12 wherein said index cam is divided into two index tooth means,
one said index tooth means being disposed above said drive cam to be engaged thereby,
and the other said cam tooth means being disposed above said locator cam to be engaged thereby.

18. A mechanism for intermittent movement along a cylindrical path comprising,
a fixed locator cam,
a movable index cam,
and a movable drive cam,
said index cam being adapted to be attached to a member to be indexed,
said index cam having a tooth means,
said locator cam having tooth means engaged by said index cam tooth means,
means urging said index cam into engagement with said locator cam,
said drive cam having a cam surface engageable with said index cam tooth means whereby said index cam is moved intermittently along said cylindrical path at a controlled sequence,
said drive cam, said index cam and said locator cam each having cam surfaces,
said cam surfaces on said locator cam engaging said cam surfaces on said index cam,
and said cam surfaces on said drive cam engaging said cam surfaces on said index cam whereby said index cam is moved relative to said drive cam in a precise kinematic path.

19. The mechanism recited in claim 18 wherein said drive cam is restrained to move in a direction perpendicular to said cylindrical path.

20. The mechanism recited in claim 18 wherein said tooth means on said drive cam and said tooth means on said locator cam each comprising a plurality of teeth.

21. The mechanism recited in claim 18 wherein said locator cam tooth means and said drive cam tooth means each comprise a plurality of teeth,
and said index cam has an index tooth.

22. The mechanism recited in claim 18 wherein said tooth means on said drive cam and said tooth means on said locator cam each comprise a single tooth, and said index cam has a plurality of teeth.

23. A device for changing axial motion to rotary motion comprising,
a base,
an index plate,
an actuating member,
an index cam,
a drive cam,
a locating cam in fixed relation to said base,
means to move said drive cam in an axial direction, means for guiding said drive cam in an axial direction,
means urging said actuating means and said drive cam toward said direction of movement of said actuating means,
means urging said index cam into engagement with said locating cam,
guide means connecting said index cam to said index plate whereby said index cam can move freely in an axial direction relative to said index plate and is connected to move with said index plate in a rotary direction,
said drive cam being spaced from said index cam and adapted to move a predetermined distance prior to engagement with said index cam,
said index cam, said locating cam and said drive cam all having cooperative cam surfaces whereby said actuating member reciprocates axially and said index plate is moved intermittently in rotation at a controlled sequence,
said drive cam, said index cam and said locating cam each having cam surfaces,
said cam surface on said locating cam engaging said cam surfaces on said index cam,
and said cam surfaces on said drive cam engaging said cam surfaces on said index cam whereby said index cam is moved relative to said drive cam in a precise incremental and progressive kinematic path.

24. The device recited in claim 23 wherein said index cam and said locator cam have inter-engaging teeth,
each said tooth having a leading edge, a tip, and a trailing edge,
and said cam surfaces formed on said leading edge, on said tip, and on said trailing edge whereby said index cam is guided in said precise kinematic path.

25. A device for changing reciprocatory motion to intermittent motion in a cylindrical path comprising,
a base,
a drive cam, a locating cam fixed to said base, an index cam, and an index plate,
means adapted to be indexed, connected to said index cam,
actuating means for said drive cam for moving said drive cam axially into engagement with said index cam,
resilient means urging said index cam toward and into engagement with said locating cam,
said drive cam being adapted to engage said index cam after said drive cam has moved a predetermined distance,
said index cam, said drive cam, and said locating cam having cooperative cam surfaces whereby said index plate is moved in rotation while said actuating means is moved in axial movement.

* * * * *